(12) United States Patent
Biset

(10) Patent No.: US 9,534,562 B2
(45) Date of Patent: Jan. 3, 2017

(54) SYSTEM AND APPARATUS FOR A THRUST REVERSER

(71) Applicant: ROHR, INC., Chula Vista, CA (US)

(72) Inventor: Charles M. Biset, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 428 days.

(21) Appl. No.: 14/261,851

(22) Filed: Apr. 25, 2014

(65) Prior Publication Data

US 2015/0308380 A1 Oct. 29, 2015

(51) Int. Cl.
*F02K 1/72* (2006.01)
*F02K 1/32* (2006.01)
*F02K 1/60* (2006.01)
*F02K 1/62* (2006.01)
*F02K 1/76* (2006.01)

(52) U.S. Cl.
CPC . *F02K 1/72* (2013.01); *F02K 1/32* (2013.01); *F02K 1/605* (2013.01); *F02K 1/625* (2013.01); *F02K 1/76* (2013.01); *F02K 1/763* (2013.01)

(58) Field of Classification Search
CPC ............... F02K 1/70; F02K 1/72; F02K 1/74; F02K 1/76; F02K 1/763; F02K 1/766
See application file for complete search history.

(56) References Cited

U.S. PATENT DOCUMENTS

| | | | |
|---|---|---|---|
| 2,950,595 A | 8/1960 | Laucher et al. | |
| 3,829,020 A | 8/1974 | Stearns | |
| 4,373,328 A * | 2/1983 | Jones | F02K 1/72 239/265.27 |
| 4,922,713 A | 5/1990 | Barbarin et al. | |
| 5,228,641 A * | 7/1993 | Remlaoui | F02K 1/72 239/265.31 |
| 5,313,788 A * | 5/1994 | Wright | F02K 1/72 239/265.29 |
| 5,655,360 A * | 8/1997 | Butler | F02K 1/72 239/265.29 |
| 7,124,981 B2 * | 10/2006 | Parham | F02K 1/70 244/110 B |
| 7,874,142 B2 * | 1/2011 | Beardsley | F02K 1/72 239/265.29 |
| 8,104,262 B2 * | 1/2012 | Marshall | F02K 1/09 239/265.19 |
| 8,109,467 B2 * | 2/2012 | Murphy | F02K 1/72 244/110 B |
| 8,316,632 B2 * | 11/2012 | West | F02K 1/32 60/226.2 |
| 8,677,733 B2 * | 3/2014 | Beardsley | F02K 1/72 60/226.2 |

(Continued)

OTHER PUBLICATIONS

Extended European Search Report dated Sep. 17, 2015 in European Application No. 15164407.7.

*Primary Examiner* — Justin Larson
(74) *Attorney, Agent, or Firm* — Snell & Wilmer, L.L.P.

(57) ABSTRACT

A thrust reverser system includes a translating cascade, a blocker door, and a drive link. The drive link may be pivotably coupled to the translating cascade and the blocker door. The translating cascade may be coupled to a translating sleeve of a nacelle. The drive link may cause the blocker door to deploy in response to the translating cascade moving in an aft direction. The blocker door may be pivotably coupled to a fixed aft portion of the nacelle.

14 Claims, 4 Drawing Sheets

(56) References Cited

U.S. PATENT DOCUMENTS

| | | | | |
|---|---|---|---|---|
| 8,783,010 B2 * | 7/2014 | Guillois | B64D 33/04 | 239/265.19 |
| 8,904,751 B2 * | 12/2014 | Howarth | | 239/265.31 |
| 9,016,040 B2 * | 4/2015 | Stuart | F02K 1/72 | 60/204 |
| 9,097,209 B2 * | 8/2015 | Charron | F02K 1/72 | |
| 9,181,898 B2 * | 11/2015 | Bhatt | F02K 1/72 | |
| 9,212,624 B2 * | 12/2015 | Aten | F02K 1/766 | |
| 9,388,768 B2 * | 7/2016 | Lohman | F02K 1/72 | |
| 2004/0195434 A1 * | 10/2004 | Parham | F02K 1/70 | 244/11 |
| 2007/0234707 A1 * | 10/2007 | Beardsley | F02K 1/72 | 60/226.2 |
| 2010/0005777 A1 * | 1/2010 | Marshall | F02K 1/09 | 60/204 |
| 2010/0212286 A1 * | 8/2010 | West | F02K 1/32 | 60/226.2 |
| 2010/0270428 A1 * | 10/2010 | Murphy | F02K 1/72 | 244/110 B |
| 2013/0025259 A1 | 1/2013 | Beardsley et al. | | |
| 2013/0255225 A1 * | 10/2013 | Charron | F02K 1/72 | 60/226.2 |
| 2014/0150403 A1 * | 6/2014 | Stuart | F02K 1/72 | 60/204 |
| 2014/0325957 A1 * | 11/2014 | Aten | F02K 1/72 | 60/226.2 |
| 2014/0353399 A1 * | 12/2014 | Stuart | F02K 1/72 | 239/11 |
| 2015/0052875 A1 * | 2/2015 | Lohman | F02K 1/72 | 60/228 |
| 2015/0107221 A1 * | 4/2015 | Aten | F02K 1/72 | 60/226.2 |
| 2015/0108248 A1 * | 4/2015 | Aten | F02K 1/72 | 239/265.19 |
| 2015/0275766 A1 * | 10/2015 | Kohlenberg | F02K 1/09 | 60/805 |
| 2015/0285184 A1 * | 10/2015 | Sawyers-Abbott | B29D 99/0025 | 60/230 |
| 2015/0308380 A1 * | 10/2015 | Biset | F02K 1/32 | 60/226.2 |
| 2016/0069297 A1 * | 3/2016 | Sawyers-Abbott | F02K 1/72 | 415/69 |
| 2016/0153399 A1 * | 6/2016 | Sawyers-Abbott | F02K 1/72 | 239/1 |

* cited by examiner

SYSTEM AND APPARATUS FOR A THRUST REVERSER

FIELD

The present disclosure generally relates to aircraft, and more particularly to thrust reverser air management.

BACKGROUND

Jet powered aircraft employ thrust reversers to reduce speed during aircraft landing. Thrust reversers generally exhaust fan air in the forward direction to create reverse thrust. Thrust reversers typically employ cascades to direct the exhausted fan air.

SUMMARY

A thrust reverser system may comprise a translating cascade, a blocker door, and a drive link. The blocker door may be configured to pivot about an aft end of the blocker door. The drive link may be pivotably coupled to the translating cascade and the blocker door.

A nacelle having a thrust reverser may comprise a fixed forward portion, a fixed aft portion, a translating sleeve, a translating cascade, and a blocker door. The translating sleeve may be located between the fixed forward portion and the fixed aft portion. The translating cascade may be coupled to the translating sleeve. The blocker door may be coupled to the translating cascade by a drive link. The blocker door may be configured to rotate about a pivot located at an aft end of the blocker door.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
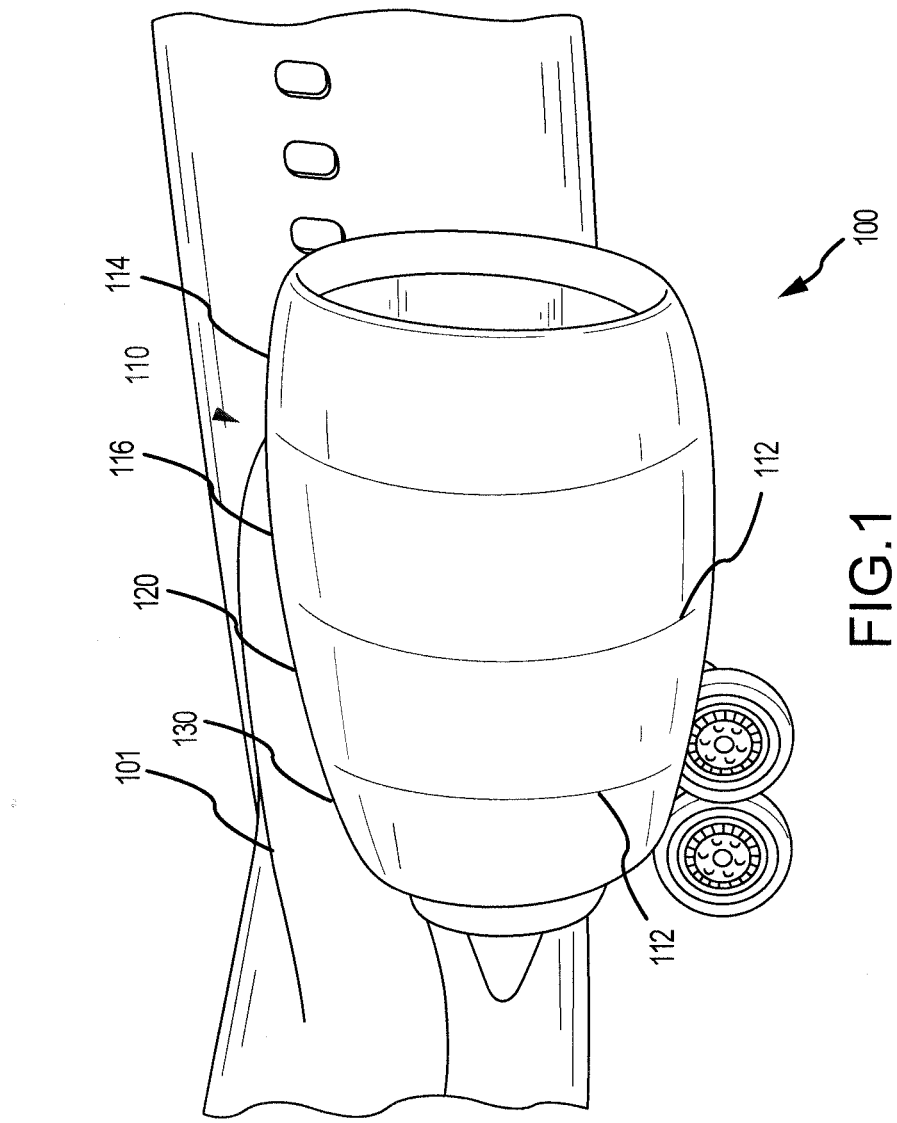
FIG. 1 illustrates a perspective view of an aircraft nacelle in a stowed configuration installed on an aircraft in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

A thrust reverser system in a gas turbine engine may comprise a translating cascade element (e.g., moveable element), a translating sleeve of a nacelle, and a blocker door. The translating cascade elements may be coupled to a translating sleeve of the nacelle. In response to the translating sleeve being moved to an aft position (e.g., the position corresponding to the thrust reverser being deployed), the translating cascade element may move aft. A drive link coupled to the translating cascade element and a forward portion of the blocker door may force the blocker door to pivot about an aft portion of the blocker door. The blocker door may divert fan air flow from the bypass duct into the translating cascade element. The cascade assembly may direct fan air flow diverted by the blocker door while the thrust reverser is deployed (e.g., during landing or any other suitable aircraft slow down event).

Conventional cascades may comprise a fixed matrix of passages that are configured to direct air flow during a thrust reverse event. Nacelles with fixed cascades may have relatively long loft lines. By providing a translating cascade, the cascade may be stored over the fan case and provide slimmer loft lines. The slimmer loft lines may provide for improved airflow, larger fan air ducts, smaller nacelles, space for plumbing or wiring, maintenance access, drag reduction, and/or the like. Additionally, by pivoting the blocker door about an aft portion of the blocker door, the drive link may be stowed in the nacelle as opposed to in the bypass duct. This may reduce drag during engine operation.

Referring to FIG. 1, an exterior view of a nacelle 100 is shown in the stowed position (e.g., with the thrust reverser inactive and nacelle 100 is closed). A propulsion system for a commercial jetliner may include a pylon 101, and a nacelle 100 surrounding an engine. The nacelle 100 surrounds the engine providing smooth aerodynamic surfaces for airflow around and into the engine. The nacelle 100 also helps define a bypass duct through the propulsion system.

A fan draws and directs a flow of air into and through the propulsion system. After the fan, the air is divided into two flowpaths, one flowpath through the engine core, and another flowpath through a bypass duct. The flow of air into the engine core flowpath passes first through a compressor that increases the pressure, and then through a combustor where the compressed air is mixed with fuel and ignited. The combustion of the fuel and air mixture causes a series of turbine blades at the rear of the engine core to rotate and in turn to drive the engine's compressor and fan. The fuel and air mixture may then be directed through an exhaust nozzle at the rear of the engine at high speed for thrust.

Air in the bypass flowpath is compressed by the fan and then directed around the engine core in a duct or ducts defined by the nacelle 100. The bypass air exits the duct through a nozzle at the rear of the propulsion system to provide thrust. In turbofan propulsion systems, the bypass flow typically provides a large portion of the thrust. A thrust reverser may selectively block bypass air in the bypass duct from reaching the nozzle, and instead redirect the bypass air to exit the duct in a forward direction of the aircraft to generate reverse thrust.

Nacelle 100 may comprise a fixed forward portion 110, a translating sleeve 120, and a fixed aft portion 130. The translating sleeve 120 may be located between the fixed forward portion 110 and the fixed aft portion 130. Split lines 112 identify the separation points or planes of translating sleeve 120 from fixed forward portion 110 and fixed aft portion 130 of the nacelle 100. Fixed forward portion 110 may comprise an inlet 114 and a fan cowl 116 of the nacelle 100. In various embodiments, fan cowl 116 may be configured to hinge open in order to provide access within nacelle 100.

Figure 2:
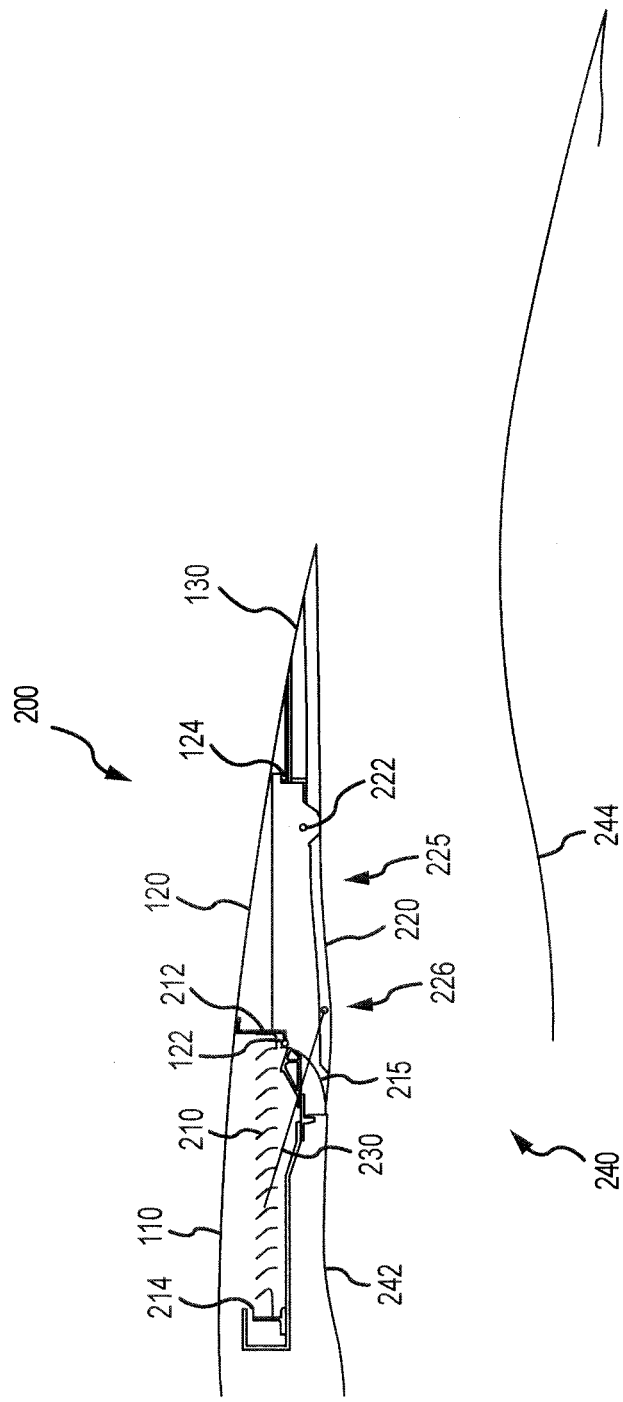
FIG. 2 illustrates a cross-sectional view of an aircraft nacelle in a stowed configuration in accordance with various embodiments.

Referring to FIG. 2, a cross-section view of a thrust reverser system 200 in the stowed position is illustrated according to various embodiments. Thrust reverser system 200 may be located within nacelle 100 shown in FIG. 1. Thrust reverser system 200 may comprise a translating cascade 210, a blocker door 220, a drive link 230, and a bypass duct 240. Bypass duct 240 may be defined by outer fan duct loft line 242 and internal fixed structure loft line ("IFS") 244. Outer fan duct loft line 242 may include portions of the fixed forward portion 110, blocker door 220, and fixed aft portion 130. The loft lines form the shape of the bypass duct 240.

In the stowed position (e.g. when nacelle 100 is closed as shown in FIGS. 1 and 2), translating cascade 210 may be stowed within fixed forward portion 110. In various embodiments, translating cascade 210 may be stowed within the fan cowl. Translating cascade 210 may be stowed in any portion of nacelle 100. In various embodiments, translating cascade 210 may be coupled to, attached to, fixed to, mounted to, or otherwise supported by translating sleeve 120. For example, translating cascade 210 may be mounted on translating sleeve 120 by aft cascade ring 212. The bracket may be any suitable size, shape, configuration, and/or material. Thrust reverser system 200 may comprise a plurality of translating cascades 210 which form a ring within fixed forward portion 110. The translating cascades 210 may be interconnected by a forward cascade ring 214 and an aft cascade ring 212. The forward cascade ring 214 and the aft cascade ring 212 may tie the translating cascades 210 together and stiffen the translating cascades 210 against outward deflection.

Blocker door 220 may form a portion of outer fan duct loft line 242. Blocker door 220 may be configured to block bypass duct 240 as further described with reference to FIG. 3. An aft end 225 of blocker door 220 may be pivotally coupled to fixed aft portion 130 of nacelle 100 at hinge 222. Blocker door 220 may be configured to pivot about hinge 222. A forward portion 226 of blocker door 220 may be coupled to translating cascade 210 via drive link 230. Drive link 230 may be stored within the nacelle 100, such as within at least one of fixed forward portion 110 and translating sleeve 120 while thrust reverser system 200 is in the stowed position. Thus, in various embodiments, drive link 230 is not within bypass duct 240 during flight.

Translating sleeve 120 may comprise forward seal 122 and aft seal 124. Forward seal 122 may be configured to form a seal between translating sleeve 120 and fixed forward portion 110. In various embodiments, forward seal 122 may contact a component having a bullnose profile 215 in fixed forward portion 110 in order to form a seal. Forward seal 122 and aft seal 124 may prevent pressure loss in bypass duct 240 while thrust reverser system 200 is in the stowed position.

Figure 3:
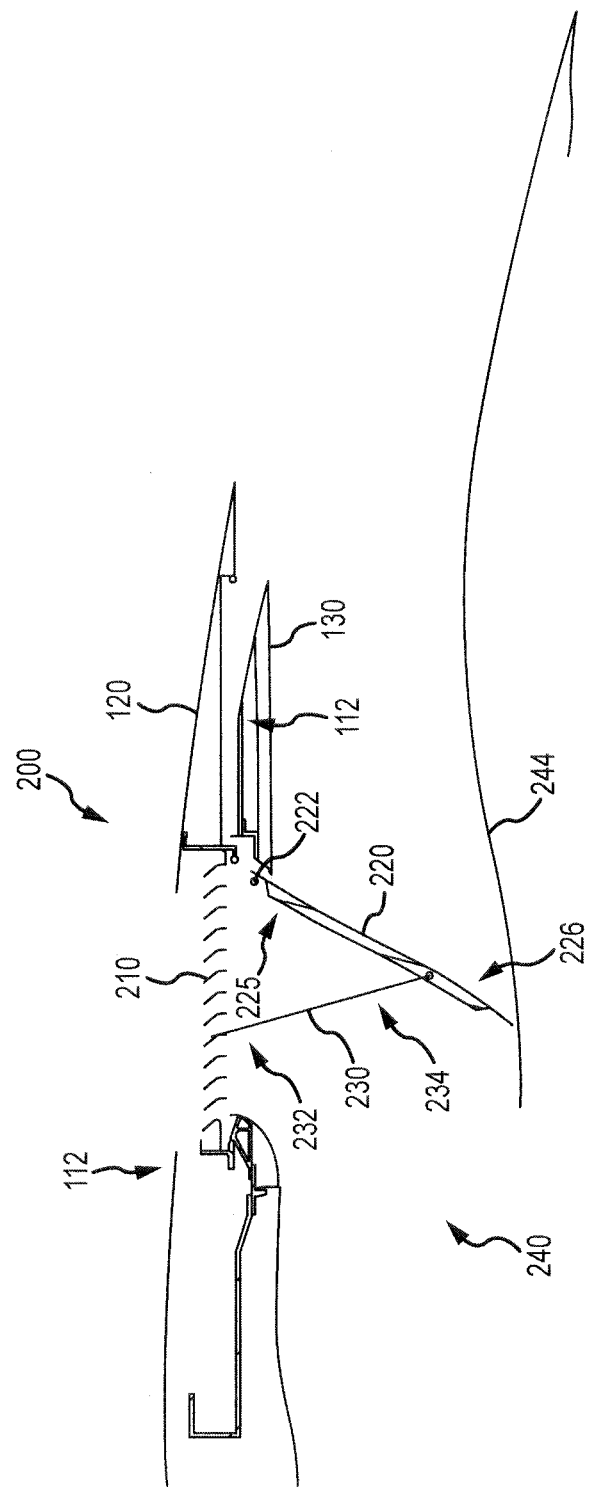
FIG. 3 illustrates a cross-sectional view of an aircraft nacelle in a thrust reverser deployed configuration in accordance with various embodiments.

Referring to FIG. 3, a cross-section view of thrust reverser system 200 in a deployed position is illustrated according to various embodiments. In the deployed position, thrust reverser system 200 may apply reverse thrust to an aircraft. In various embodiments, and in response to thrust reverser system being deployed 200, translating sleeve 120 may move aft, separating from nacelle 100 along split lines 112. Translating sleeve 120 may move aft and to the exterior of fixed aft portion 130 of nacelle 100, such that translating sleeve 120 may overlap fixed aft portion 130. This overlapping configuration for a translating sleeve may be referred to as a "split sleeve."

Upon deployment of the thrust reverser, an actuator may drive the translating sleeve 120 in the aft direction. Translating sleeve 120 may be coupled to the aft cascade ring 212 and/or the translating cascade 210. The translating cascade 210 may be coupled to a forward end 232 of drive link 230. In various embodiments, forward end 232 of drive link 230 may be operatively coupled to translating cascade 210, such that forward end 232 of drive link 230 is coupled to any suitable component which translates with translating cascade 210. The translating components of nacelle 100 may translate forward and aft relative to nacelle 100 in a track and slider mechanism. A hinge 222 of blocker door 220 may be coupled to fixed aft portion 130. Blocker door 220 may pivot about its aft end 225 at hinge 222. In various embodiments, blocker door 220 may be referred to as a revolute mechanism, as relative movement of blocker door 220 may be limited to rotation about hinge 222, which is coupled to fixed aft portion 130. Therefore, as translating sleeve 120 moves aft, forward end 232 of drive link 230 also moves aft. Because drive link 230 and blocker door 220 each have a fixed length and blocker door 220 is limited to rotation about hinge 222, as forward end 232 of drive link 230 moves aft, drive link 230 rotates and drives forward portion 226 of blocker door 220 into the bypass duct 240. Blocker door 220 may then divert air from the bypass duct 240 through translating cascade 210.

Figure 4:
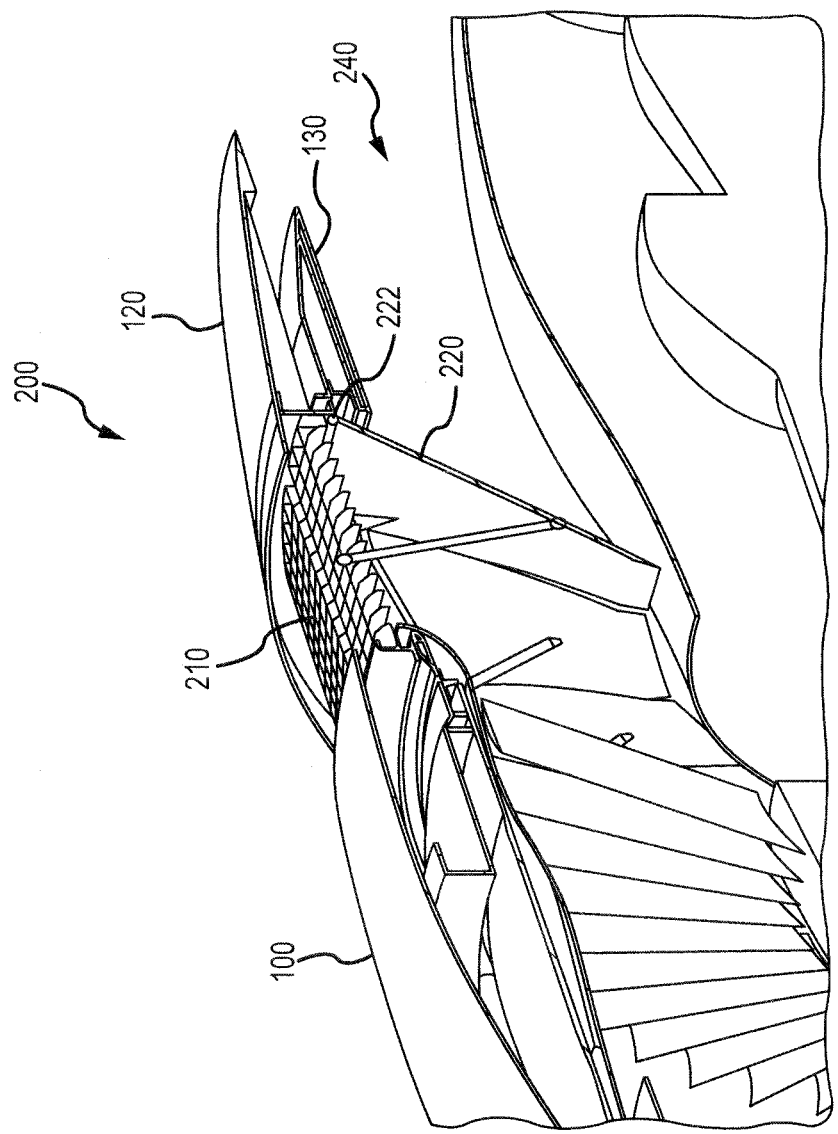
FIG. 4 illustrates a perspective cutaway view of an aircraft nacelle in a thrust reverser deployed configuration in accordance with various embodiments.

Referring to FIG. 4, a perspective cutaway view of a thrust reverser system 200 in a deployed position is illustrated according to various embodiments. Blocker doors 220 may redirect airflow in bypass duct 240 through translating cascade 210. Translating cascade may be coupled to translating sleeve 120. Translating sleeve 120 may overlap fixed aft portion 130 of nacelle 100 in the deployed position. Blocker doors 220 may be pivotably coupled to fixed aft portion 130 at hinge 222.

In various embodiments, translating cascade 210 may be any suitable shape or size. Translating cascade 210 may also be configured to direct or control the flow of fan air (e.g., when the thrust reverser is active) in any suitable fashion. In various embodiments, the cascades and blocker doors described herein may be employed on, installed on, or otherwise used with any suitable nacelle, engine, and/or thrust reverser system. In various embodiments, the cascades and blocker doors described herein reduce the package size of the cascade structure, enabling slimmer and shorter loft lines in an aircraft nacelle, as well as removing the drive link from the bypass duct during flight.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser system comprising:
    a translating cascade coupled to a translating sleeve;
    a fixed forward portion and a fixed aft portion, wherein the fixed forward portion and the fixed aft portion form a portion of a nacelle loft line, and wherein the translating sleeve is located between the fixed forward portion and the fixed aft portion;
    a blocker door configured to pivot about an aft end of the blocker door; and
    a drive link operatively coupled to the translating cascade and the blocker door.

2. The thrust reverser system of claim 1, wherein the blocker door is pivotably coupled to the fixed aft portion.

3. The thrust reverser system of claim 1, wherein the drive link is stowed within a fan cowl.

4. The thrust reverser system of claim 1, wherein the drive link is coupled to a forward end of the blocker door.

5. The thrust reverser system of claim 1, wherein the drive link is configured to deploy the blocker door in response to the translating cascade moving in an aft direction.

6. The thrust reverser system of claim 1, wherein the nacelle comprises a split sleeve.

7. The thrust reverser system of claim 1, wherein the blocker door forms a portion of the nacelle loft line.

8. A nacelle having a thrust reverser comprising:
    a fixed forward portion;
    a fixed aft portion, wherein the fixed forward portion and the fixed aft portion form a portion of a nacelle loft line;
    a translating sleeve located between the fixed forward portion and the fixed aft portion;
    a translating cascade coupled to the translating sleeve; and
    a blocker door coupled to the translating cascade by a drive link, wherein the blocker door is configured to rotate about a pivot located at an aft end of the blocker door.

9. The nacelle of claim 8, wherein the blocker door is pivotably coupled to the fixed aft portion.

10. The nacelle of claim 8, wherein the drive link is configured to be stowed in the fixed forward portion.

11. The nacelle of claim 8, wherein the drive link is coupled to a forward end of the blocker door.

12. The nacelle of claim 8, wherein the drive link is configured to deploy the blocker door in response to the translating cascade moving in an aft direction.

13. The nacelle of claim 8, wherein the translating sleeve is configured to overlap the fixed aft portion in a deployed position.

14. The nacelle of claim 8, further comprising a forward seal between the fixed forward portion and the translating sleeve, and an aft seal between the translating sleeve and the fixed aft portion.

* * * * *